US006641387B1

(12) United States Patent
Letroublon et al.

(10) Patent No.: US 6,641,387 B1
(45) Date of Patent: Nov. 4, 2003

(54) INSTALLATION FOR PRODUCING STRUCTURAL PARTS MADE OF A THERMOPLASTIC MATERIAL FOR MOTOR VEHICLES

(75) Inventors: Michel Letroublon, Valentigney (FR); Rémi Domagata, Mandeure (FR); Philippe Dumazet, Montbeliard (FR)

(73) Assignee: Faurecia Industries, Boulogne Billancourt (FR)

( * ) Notice: Subject to any disclaimer, the term of this patent is extended or adjusted under 35 U.S.C. 154(b) by 0 days.

(21) Appl. No.: 09/890,966

(22) PCT Filed: Feb. 1, 2000

(86) PCT No.: PCT/FR00/00231

§ 371 (c)(1),
(2), (4) Date: Aug. 8, 2001

(87) PCT Pub. No.: WO00/47385

PCT Pub. Date: Aug. 17, 2000

(30) Foreign Application Priority Data

Feb. 11, 1999 (FR) .............................. 99 01643

(51) Int. Cl.⁷ .............................................. B29C 45/07
(52) U.S. Cl. ....................... 425/560; 425/562; 425/572; 425/587
(58) Field of Search ................... 425/557, 559, 425/560, 562, 572, 587

(56) References Cited

U.S. PATENT DOCUMENTS 3,191,233 A * 6/1965 Linderoth, Jr. ............... 425/146
4,124,308 A * 11/1978 Sokolow ....................... 366/77
4,390,332 A * 6/1983 Hendry ........................ 425/4 R
5,277,567 A * 1/1994 Bauer et al. ................. 425/130
5,698,242 A * 12/1997 Chen et al. .................. 425/544
5,798,128 A * 8/1998 Dumazet et al. ............ 425/147
5,928,596 A * 7/1999 McLeod et al. ......... 264/297.2

FOREIGN PATENT DOCUMENTS

| DE | 38 43 342 A1 | 6/1990 |
| EP | 0 895 845 A1 | 2/1999 |
| FR | 2 734 199 A1 | 11/1996 |

* cited by examiner

Primary Examiner—W. L. Walker
Assistant Examiner—Emmanuel Luk
(74) Attorney, Agent, or Firm—Sughrue Mion, PLLC

(57) ABSTRACT

The installation contains means (1) for continuous production of a paste made of a thermoplastic material, means (8) for accumulating and temporarily storing the paste thus produced and means (15) for taking the paste out of the accumulating means and storage means and introducing it into a first mould comprising thermoregulated means in the form of a syringe. The invention is characterised in that the output of the accumulating means and storage means comprises a distributor (12) that has at least two outputs (13, 14) and can be controlled in order to deliver the paste to one of the two outputs, whereby one of said outputs (13) is adapted in order to be coupled to thermoregulated means (15) in the form of a syringe and the other output (14) is adapted in order to be permanently connected to the charging orifice of a piston (17) that injects the paste at a high pressure into a second part-forming mold (17), whereby one output thereof (19) is adapted in order to be permanently coupled to the second mold.

4 Claims, 1 Drawing Sheet

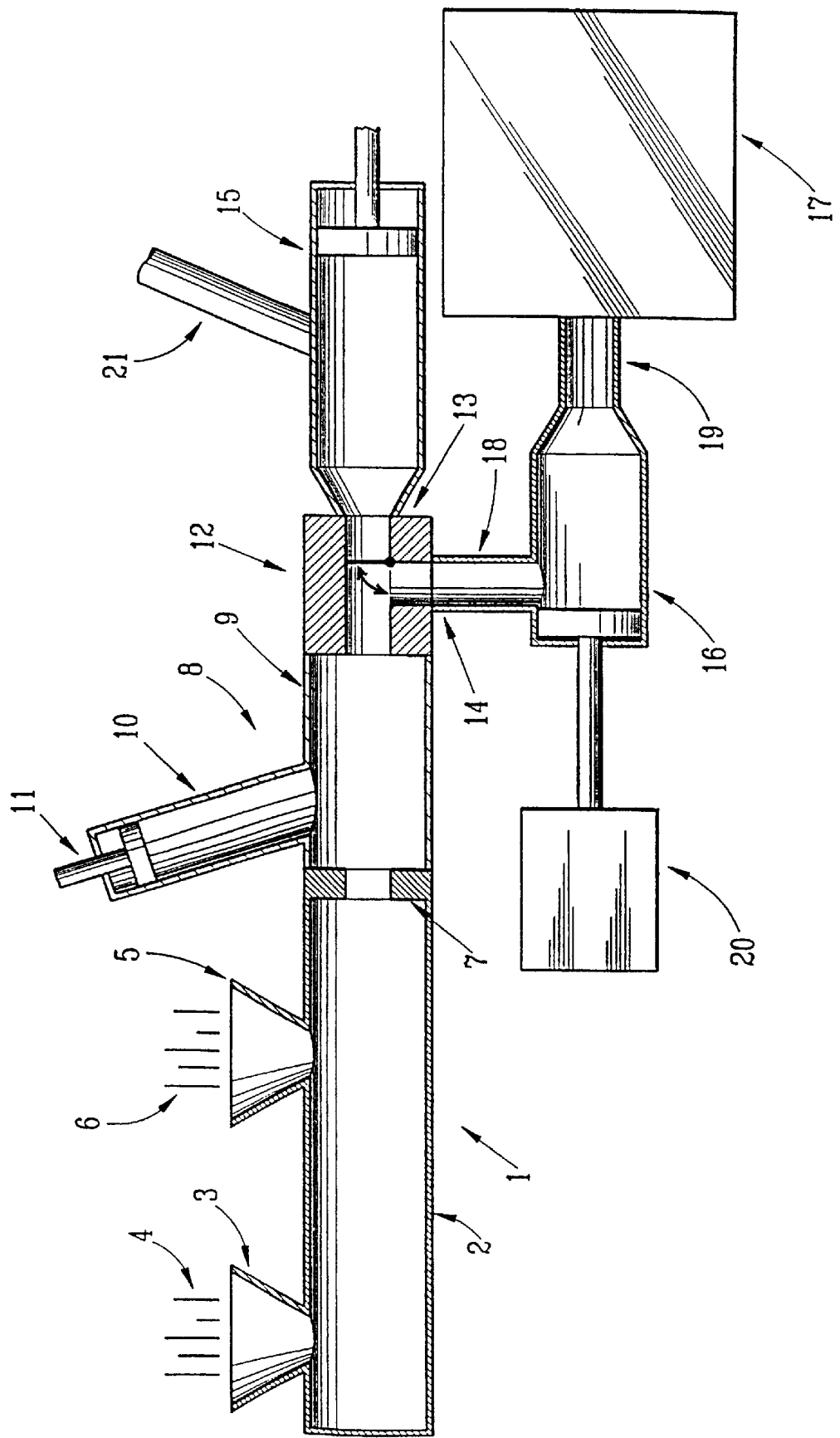

INSTALLATION FOR PRODUCING STRUCTURAL PARTS MADE OF A THERMOPLASTIC MATERIAL FOR MOTOR VEHICLES

BACKGROUND OF THE INVENTION

The present invention relates to a plant for manufacturing structural components made of a thermoplastic, especially for motor vehicles.

The Applicant has already described, in document FR-A-2 734 199, a plant of this type which includes means for the continuous production of a thermoplastic dough, means for the accumulation and temporary storage of the dough produced and means for the removal of the dough from the accumulation and temporary storage means and for the introduction of this removed dough into a component-forming mold, these removal means comprising thermoregulated means in the form of a syringe having at least one dough charging/discharging orifice.

These thermoregulated means in the form of a syringe are carried by handling means and can move between a dough-charging first position, in which the dough charging/discharging orifice of the means in the form of a syringe is connected to the outlet of the dough accumulation and temporary storage means in order to allow transfer of the dough from these accumulation and temporary storage means into these means in the form of a syringe, and a second position for introducing the dough with which these means have been charged into the component-forming mold.

However, such a plant may be relatively difficult to use when it is desired to inject the dough under high pressure into the mold.

This is because problems may then arise of how to couple the thermoregulated means in the form of a syringe, on the one hand, to the outlet of the dough accumulation and temporary storage means and, on the other hand, to the mold.

Moreover, it is also necessary for the thermoregulated means in the form of a syringe to be combined with high-pressure actuation means, thereby increasing the weight and overall size and making it difficult for them to be moved between the charging and introduction positions.

SUMMARY OF THE INVENTION

It is therefore an object of the invention to solve these problems.

For this purpose, the subject of the invention is a plant for manufacturing structural components made of a thermoplastic, especially for motor vehicles, comprising means for the continuous production of a thermoplastic dough, means for the accumulation and temporary storage of the dough produced and means for the removal of the dough from the accumulation and temporary storage means and for the introduction of this removed dough into a first component-forming mold, comprising thermoregulated means in the form of a syringe having at least one dough charging/discharging orifice, these being carried by handling means and being able to move between a dough-charging first position, in which the dough charging/discharging orifice of the means in the form of a syringe is connected to the outlet of the dough accumulation and temporary storage means in order to allow transfer of the dough from these accumulation and temporary storage means into the means in the form of a syringe, and a second position for introducing the dough with which these means have been charged into the first mold, characterized in that the outlet of the accumulation and storage means has a directional control device which has at least two outlets and can be controlled so as to deliver the dough to one or other of them, one of the outlets being designed to be coupled to the charging/discharging orifice of the thermoregulated means in the form of a syringe and the other outlet being designed to be coupled permanently to the charging orifice of a ram for injecting dough under high pressure into a second component-forming mold, an outlet orifice of which is designed to be coupled permanently to this second mold

BRIEF DESCRIPTION OF THE DRAWING

The invention will be more clearly understood with the aid of the description which follows, given solely by way of example and with reference to the appended drawing which shows a schematic diagram illustrating the general structure of a component manufacturing plant according to the invention.

DETAILED DESCRIPTION OF THE INVENTION

The single drawing FIGURE shows in fact a manufacturing plant of which some of the elements have already been described in detail in the document mentioned above and to which reference may be made.

Thus, for example, this plant comprises means for the continuous production of a thermoplastic dough.

These means are denoted by the overall reference number 1 in this FIGURE and comprise, for example, a thermoregulated extruder denoted by the overall reference number 2.

In the illustrative example described, this extruder receives, at a first inlet denoted by the overall reference number 3, the thermoplastic 4 and, at a second inlet denoted by the overall reference number 5, a filler or a reinforcing material, denoted by the overall reference number 6 and consisting, for example, of fibers or other materials.

At the exit of this extruder, the dough passes, for example, through an exit die denoted by the overall reference number 7 before entering, in the form of a dough extrudate, means for the accumulation and temporary storage of this dough, these means being denoted by the overall reference number 8 in this FIGURE.

In accordance with what was described in the abovementioned document, these means may comprise a first, for example cylindrical, reservoir part, denoted by the overall reference number 9, lying along the extension of the production means and a second, for example cylindrical, reservoir part, denoted by the overall reference number 10, which extends laterally from the first part and in which dough compacting/ejection means, denoted by the overall reference number 11, are placed.

A detailed description of these various means may be found in the abovementioned document.

According to the invention, the outlet of these dough accumulation and temporary storage means 8 comprises a directional control device 12 which has at least two outlets and can be controlled, for example, by a controller so as to deliver the dough to one or other of them.

One of these outlets, for example 13, is designed to be coupled to a charging/discharging orifice of the thermoregulated means in the form of a syringe, which are denoted by the overall reference number 15 in this FIGURE, and the other outlet, for example 14, is designed to be coupled permanently to the charging orifice of a ram 16 for injecting dough under high pressure into a component-forming mold, denoted by the overall reference number 17, and the outlet orifice of which is designed to be coupled permanently to this mold.

In this FIGURE, the charging orifice of the ram 16 is denoted by the overall reference number 18 and is therefore permanently coupled to the outlet 14 of the directional control device 12.

The discharging orifice of the ram 16 is denoted by the overall reference number 19 and is therefore permanently coupled to the mold 17.

The ram may be coupled to the directional control device and to the mold by, for example, the bolting of flanges, etc.

It may be noted that these couplings may be configured in order to control the anisotropy of the dough for the purpose of optimizing the properties of the component.

The ram 16 is also associated with a high-pressure actuation unit, denoted by the overall reference number 20, and having whatever suitable structure and being combined with means for controlling its operation on the basis of various items of information about the dough, for example its pressure, temperature or other parameters.

The thermoregulated means 15 in the form of a syringe are designed to be carried by handling means, a part 21 of which is shown in this FIGURE, so as to be able to be moved between a dough-charging first position, in which the charging/discharging orifice of these thermoregulated means in the form of a syringe is connected to the outlet 13 of the directional control device 12, and a second position for discharging the dough into a corresponding component-forming mold, like the mold described in the abovementioned document.

In the illustrative example shown, the directional control valve 12 is, for example, in the form of a three-way valve, having one inlet and two outlets.

Of course, it goes without saying that any other type of valve may be envisioned, in order to allow, for example, two high-pressure injection rams to be fed with dough alternately, each ram being associated with a corresponding mold, instead of a single mold.

It may be noted that these two rams may be controlled differently from one another, for example in terms of displacement travel, etc., in order to provide the corresponding two molds with a different dough feed.

It will therefore be appreciated that such a structure has a number of advantages, especially with regard to its adaptability and the improvement in component productivity insofar as the thermoregulated means 15 are used to feed a first mold while at the same time the ram 16 is feeding a second mold, without there being any discontinuity in dough production.

What is claimed is:

1. A plant for manufacturing structural components made of a thermoplastic, especially for motor vehicles, comprising means (1) for the continuous production of a thermoplastic dough, means (8) for the accumulation and temporary storage of the dough produced and means (15) for the removal of the dough from the accumulation and temporary storage means and for the introduction of this removed dough into a first component-forming mold, comprising thermoregulated means in the form of a syringe having at least one dough charging/discharging orifice, these being carried by handling means (21) and being able to move between a dough-charging first position, in which the dough charging/discharging orifice of the means in the form of a syringe is connected to the outlet of the dough accumulation and temporary storage means (8) in order to allow transfer of the dough from these accumulation and temporary storage means into the means in the form of a syringe, and a second position for introducing the dough with which these means have been charged into the first mold, characterized in that the outlet of the accumulation and storage means (8) has a directional control device (12) which has at least two outlets (13, 14) and can be controlled so as to deliver the dough to one or other of them, one (13) of the outlets being designed to be coupled to the charging/discharging orifice of the thermoregulated means (15) in the form of a syringe and the other outlet (14) being designed to be coupled permanently to the charging orifice of a ram (16) for injecting dough under high pressure into a second component-forming mold (17), an outlet orifice (19) of which is designed to be coupled permanently to this second mold.

2. The plant as claimed in claim 1, characterized in that the directional control device (12) is formed by an at least three-way valve.

3. The plant as claimed in claim 1, characterized in that the directional control device can be controlled by a controller.

4. The plant as claimed in claim 1, characterized in that the directional control device (12) is connected to two high-pressure injection rams, each ram being associated with a mold and being controlled in a different manner in order to provide each mold with a different feed.

\* \* \* \* \*